US007733620B2

(12) United States Patent
Yu et al.

(10) Patent No.: US 7,733,620 B2

(45) Date of Patent: Jun. 8, 2010

(54) CHIP SCALE GAS DISCHARGE PROTECTIVE DEVICE AND FABRICATION METHOD OF THE SAME

(75) Inventors: Ho-Chieh Yu, Taoyuan (TW); Jiun-You Lin, Sinjhuang (TW); Hung-Yi Chuang, Hsinchu (TW); Tsai-Pao Chiang, Luchu Hsiang (TW)

(73) Assignee: TA-I Technology Co., Ltd, Luchu Hsiang (TW)

( * ) Notice: Subject to any disclaimer, the term of this patent is extended or adjusted under 35 U.S.C. 154(b) by 438 days.

(21) Appl. No.: 11/691,014

(22) Filed: Mar. 26, 2007

(65) Prior Publication Data

US 2008/0239610 A1 Oct. 2, 2008

(30) Foreign Application Priority Data

Jul. 19, 2006 (CN) ................................ 95 1 26341

(51) Int. Cl.
*H02H 7/20* (2006.01)
*H02H 1/00* (2006.01)

(52) U.S. Cl. ...................................................... 361/112

(58) Field of Classification Search .................. 361/112
See application file for complete search history.

(56) References Cited

U.S. PATENT DOCUMENTS 4,158,079 A * 6/1979 Severus-Laubenfeld ..... 428/172
4,411,982 A * 10/1983 Shibuya et al. .............. 430/314
5,408,130 A * 4/1995 Woo et al. ................... 257/758
5,436,608 A * 7/1995 Togura ........................ 338/21
5,595,637 A * 1/1997 Tench et al. ................... 205/91
5,969,924 A * 10/1999 Noble ......................... 361/56
7,041,436 B2 * 5/2006 Krause et al. ............... 430/322
2008/0191336 A1 * 8/2008 Tsai ........................... 257/682
2010/0020458 A1 * 1/2010 Yu et al. ..................... 361/111

FOREIGN PATENT DOCUMENTS

DE 3322679 A1 * 1/1985
JP 05226059 A * 9/1993
JP A-H08-236260 * 9/1996
JP A-2000-173743 * 6/2000
JP A-2001-43954 * 2/2001

OTHER PUBLICATIONS

Measurement and Simulation of the Behavior of a Short Spark Gap used as ESD Protection Device; Bonisch et al.; pp. 37-41; IEEE 2003 (No Month).*

* cited by examiner

*Primary Examiner*—Ronald W Leja
(74) *Attorney, Agent, or Firm*—Lowe Hauptman Ham & Berner, LLP

(57) ABSTRACT

Disclosed is a chip scale gas discharge protective device whose metal coupled electrodes are fabricated through processes of yellow light, image formation, and electro casting of metal electrode, and the two electrodes are facing each other in arch lines with the distance of a gap controlled within the range of 0.5~10 μm, wherein the entire structure is performed by a bridge process without an extra gas filling procedure in the gap. Due to the fact that the gap is as small as only several μm, a relevant potential difference existing across there is sufficient to ionize the air thereby suppressing the electrostatic discharge (ESD) through the protected electronic device, whereas the fabrication method is disclosed.

9 Claims, 6 Drawing Sheets

CHIP SCALE GAS DISCHARGE PROTECTIVE DEVICE AND FABRICATION METHOD OF THE SAME

BACKGROUND OF THE INVENTION

1. Field of the Invention

The present invention relates to a chip scale gas discharge protective device and fabrication method of the same, and more particularly, to a chip scale gas discharge protective device whose metal coupled electrodes are fabricated through processes of yellow light image formation and metal electrode electro-casting, and the two electrodes facing each other in arch lines with the distance of a gap controlled within the range of 0.5~10 μm, wherein the entire structure is performed by a bridge process without an extra gas filling procedure in the gap. Due to the fact that the gap between the two electrodes is as small as only several μm, a relevant potential difference existing across there is sufficient to ionize the air thereby suppressing the value of voltage of electro-static discharge (ESD) through the protected electronic device.

2. Description of the Prior Art

The over-voltage protection or the discharge protection device is absolutely necessary for telephones, facsimile machines, data phones, etc. For the aforementioned electro communication equipments, it is of a great importance to protect them from damage due to an attack of abnormal electro-static discharge (ESD).

There are a lot of prevention designs for ESD; for example, provision of electric shielding, discharge gap, capacitor, laminated MLV, semiconductor device, etc.

Among them, the provision of a discharge gap is the most popular for over-voltage protection, especially the dielectric substance used to fill between the two electrodes for the discharge gap plays the most important role in the over-voltage protection, and gaseous substances presently in use are generally considered to be quite satisfactory.

Taking air to be filled between two copper electrodes (e.g. air used as the dielectric medium for the discharge gap) for instance, when the device is undergoing ESD, the relation between the distance of the electrodes and the discharge initiation voltage is shown in FIG. 4.

However, in an air discharge device conventionally in use, its gap is normally made of the diamond cutting or laser trimming process so as to form a discharge gap with a distance of about 10~30 μm between two electrodes, thereby keeping a rather high initiation energy of discharge. Thus, the air discharge device constructed as such is merely applicable to lightning or high energy surge impulse protection. As for ESD protection for the precision electronic communication equipment, a further consideration is required.

SUMMARY OF THE INVENTION

Accordingly, in order to rectify aforesaid flaws inherent to the prior arts, the main object of the present invention is to provide a chip scale gas discharge protective device and fabrication method of the same wherein the yellow light micro-image forming process and the metal electrode casting process are employed to fabricated a pair of metal coupled electrodes apart from each other with a distance as short as only 0.5~10 μm.

Another object of the present invention is to configurate the metal coupled electrodes fabricated as such to have their corresponding terminals facing each other in arch lines so as to avoid the damage of the discharge terminal of the protective device due to the arcing horn effect.

The chip scale gas discharge protective device according to the present invention maintains the distance of its discharge gap between the metal coupled electrodes as short as below 10 μm so as to lower its breakdown voltage thereby widely applicable to protecting various electronic equipments.

As the distance of the discharge gap between the metal coupled electrodes is maintained below 10 μm, when the protected equipment encounters the attack of ESD, the protective device of the present invention is able to initiate its protective performance before reaching 500 mV of ESD voltage.

As for the detailed construction, fabrication steps, and performance of the present invention, it will become more apparent by description of the preferred embodiment with reference to the following accompanied drawings.

DETAILED DESCRIPTION OF THE PREFERRED EMBODIMENTS

Figure 1A:
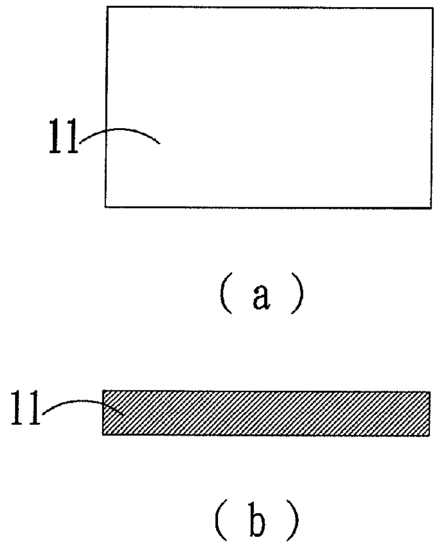
FIGS. 1A(*a*) to 1G(*b*) are top and longitudinal cross sectional views illustrating the fabrication steps of the metal coupled electrodes of the present invention.
Figure 1B:
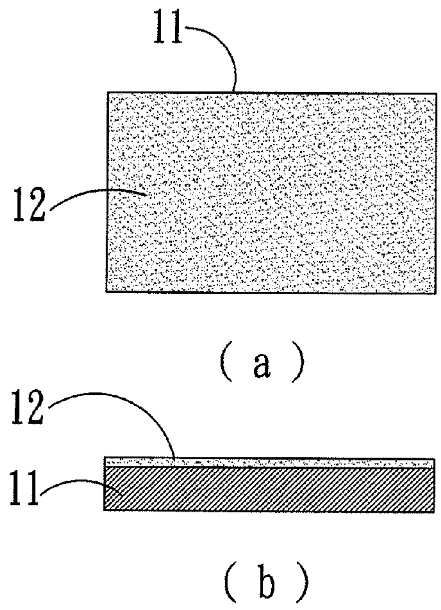
Figure 1C:
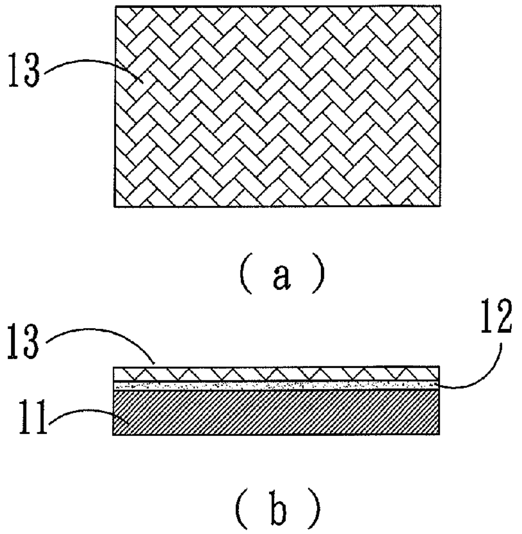
Figure 1D:
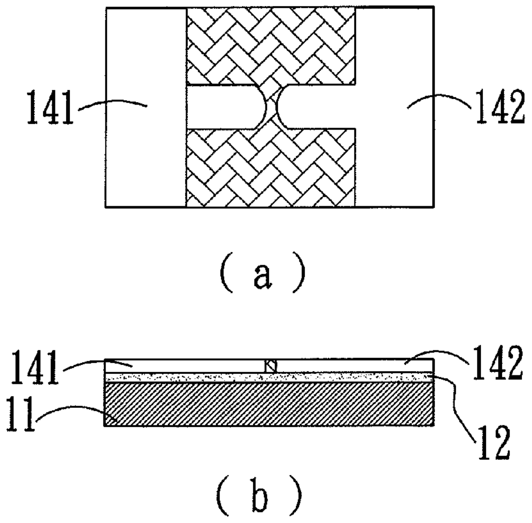
Figure 1E:
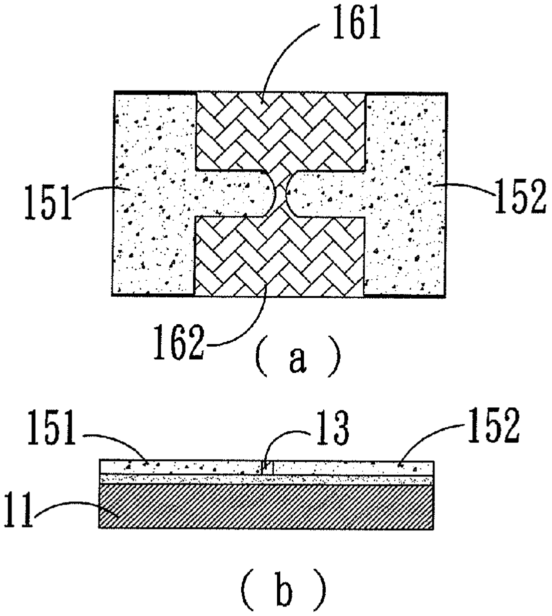
Figure 1G:
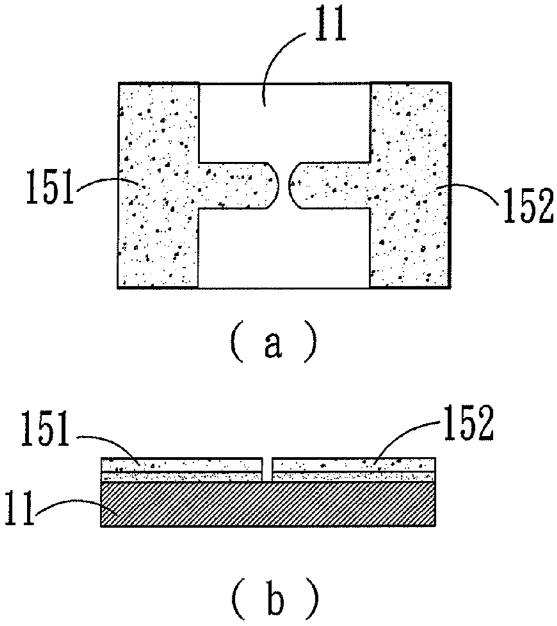
Figure 1F:
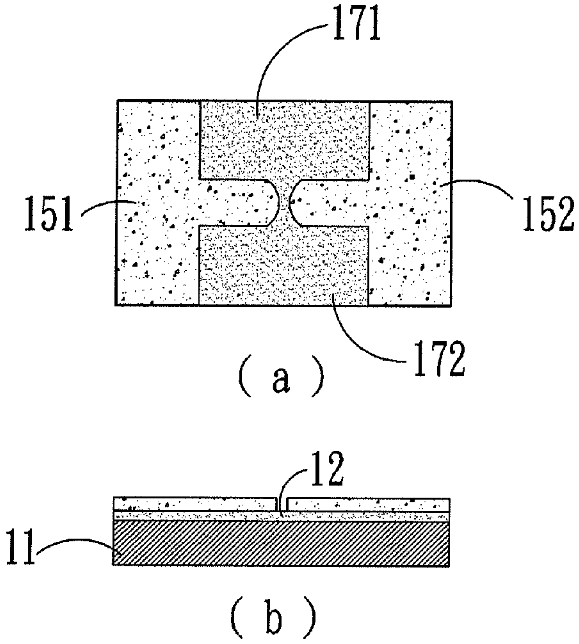
Figure 2A:
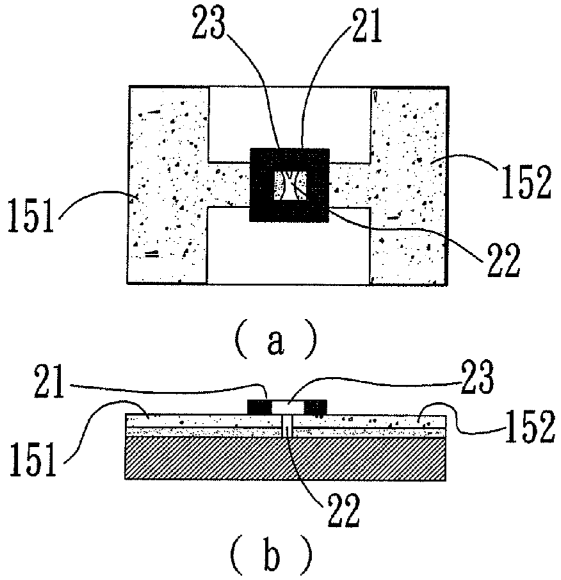
FIGS. 2A(*a*) to 2F(*b*) are top and longitudinal cross sectional views illustrating the fabrication steps of the intermediate air chamber.
Figure 2B:
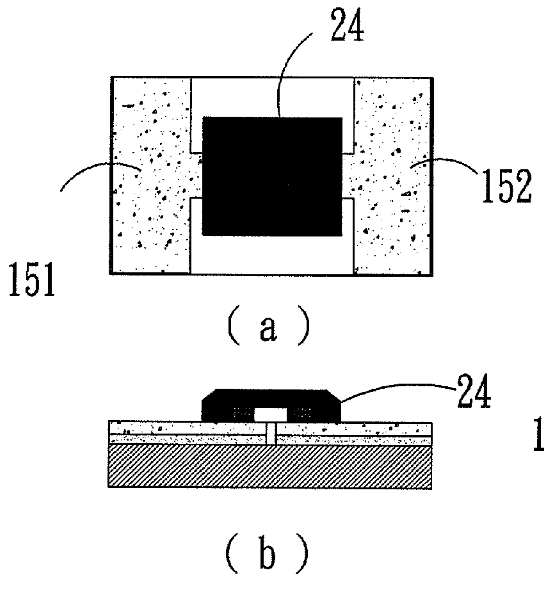
Figure 2C:
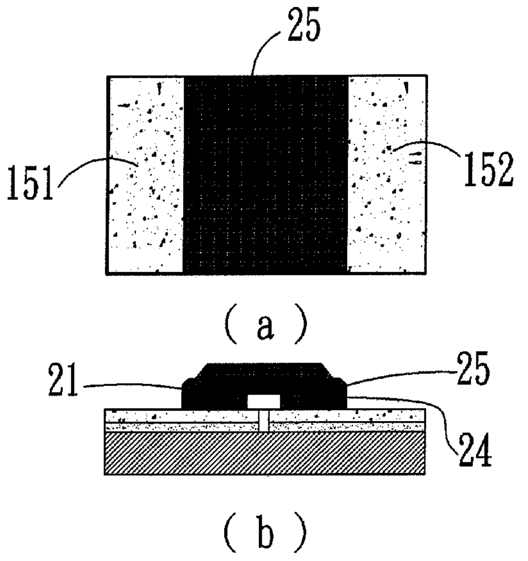
Figure 2D:
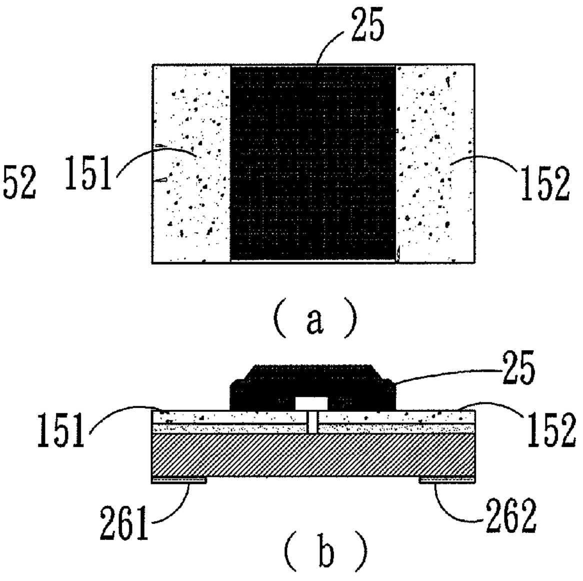
Figure 2E:
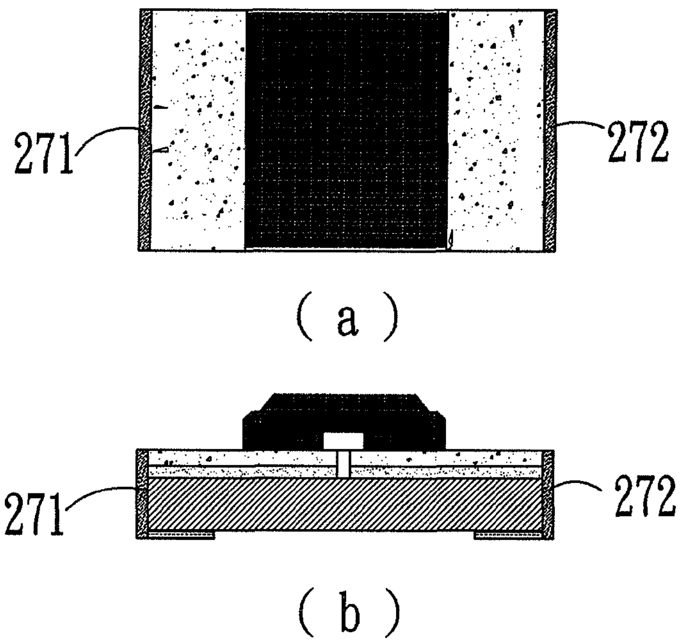
Figure 2F:
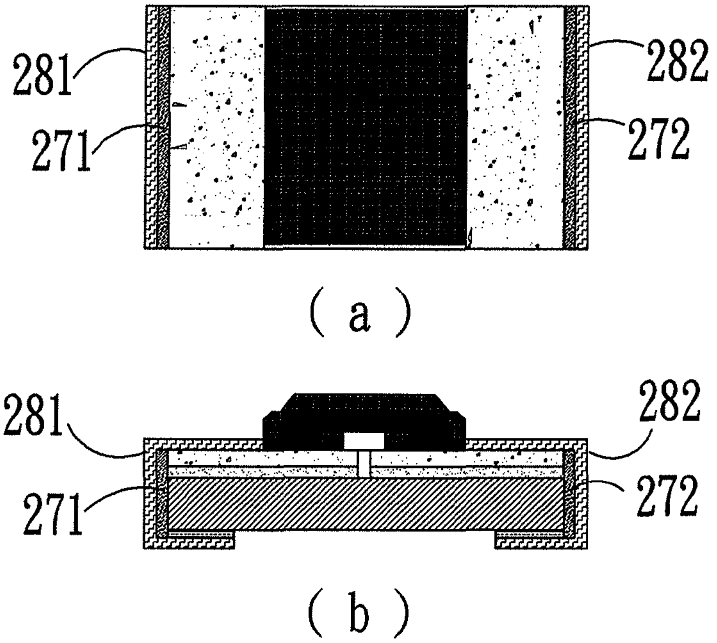

The fabrication steps of the chip scale gas discharge protective device of the present invention are as follows:

preparing an aluminum oxide substrate 11 [refer to FIGS. 1A(*a*) & (*b*)];

coating a layer of TiW/Cu film on the cleaned aluminum oxide substrate 11 to form a seed layer 12 [refer to FIGS. 1B(*a*) & (*b*)];

coating a layer of photo resist 13 on the surface of the seed layer 12 [refer to FIGS. 1C(*a*) & (*b*)];

removing the photo resist substance on pre-patterns 141, 142 [refer to FIGS. 1D(*a*) & (*b*)] by exposing and developing for subsequent electro-casting;

plating a metal electrode respectively on the pre-patterns 141 and 142 so as to form a pair of metal coupled electrodes 151 and 152 facing to each other with a distance of several μm [prefer to FIGS. 1E (*a*) & (*b*)];

removing the photo resist layers 161, 162 except those on the metal coupled electrodes 151, 152 (see FIG. 1*f*);

removing the seed layers 171, 172 except those on the metal coupled electrodes 151, 152 by etching thus completing fabricating of the pair of metal coupled electrodes 151, 152 having a gap of several μm distance on the aluminum oxide substrate 11 [refer to FIGS. 1G(*a*) & (*b*)];

affixing a layer of dry film made of a high molecular substance to the gap (to be referred as an intermediate air chamber 22 hereinafter) between the metal coupled electrodes 151 and 152 so as to form a bridge layer 21 [refer to FIGS. 2A(*a*) & (*b*)] with a size able to relevantly cover the intermediate air chamber 22, and retaining a pore 23 on the bridge layer 21 at the position aligned with the intermediate air chamber 22, the purpose for forming the bridge layer 21 is to increase the wall thickness of the air chamber 22 so as to avoid affixed photo resist substance in the subsequent process from being in contact with the substrate without causing damage to the air chamber structure;

enclosing the bridge layer 21 with the high molecular dry film so as to form a first protective layer 24 thereby making a perfectly sealed intermediate air chamber 22 [refer to FIGS. 2B(*a*) & (*b*)];

forming a second protective layer 25 by printing so as to shield all clearances for protection of the circuit [refer to FIGS. 2C(*a*) & (*b*)];

forming rear electrodes 261, 262 by coating [refer to FIG. 2*d]*;

using Ni—Cr/Ni—Cu alloy as material to form terminal electrodes 271, 272 by coating [refer to FIG. 2*e]*;

employing Ni/Sn to form soldered interfacial layers 281, 282 [refer to FIG. 2*f*] therefore finishing the fabrication of the chip type atmospheric discharge protective device.

The material for forming aforesaid metal electrode or seed layer may be selected from copper, copper alloy, silver, silver alloy, titanium, titanium alloy, nickel, nickel alloy, gold, gold alloy, platinum, platinum alloy, aluminum, or aluminum alloy.

The material for aforesaid high molecular substance or photo resist substance may be selected from epoxy, polyamide, acryl, or silicon.

Figure 3:
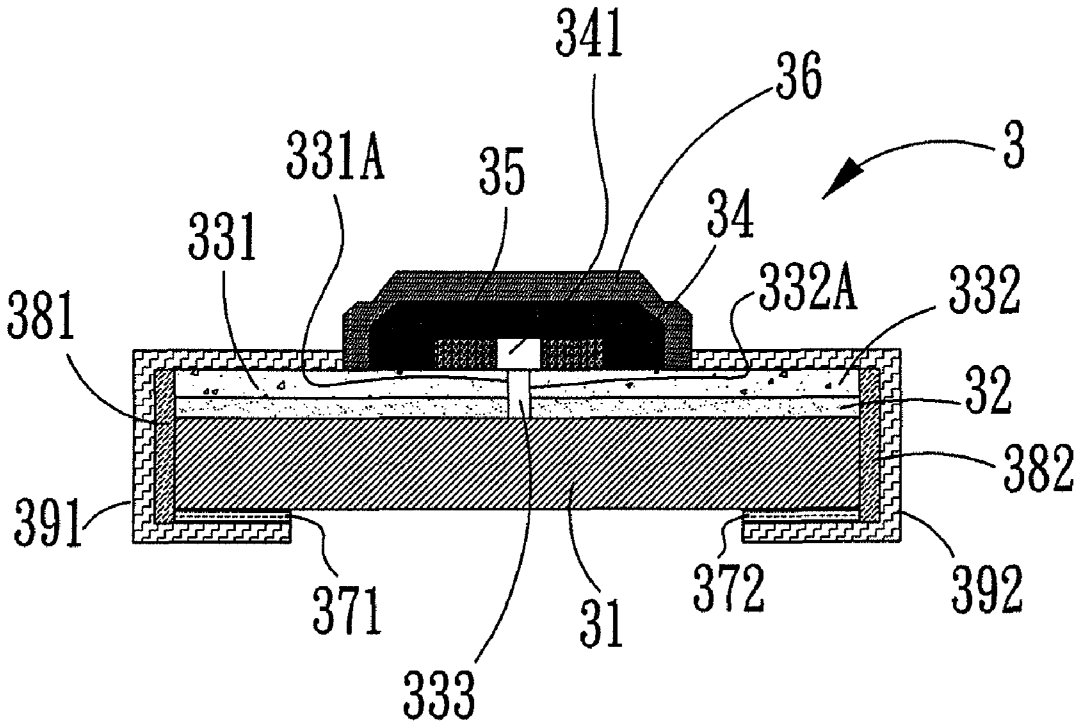
FIG. 3 is a longitudinal cross sectional view of the chip scale gas discharge protective device according to the present invention.
Figure 4:
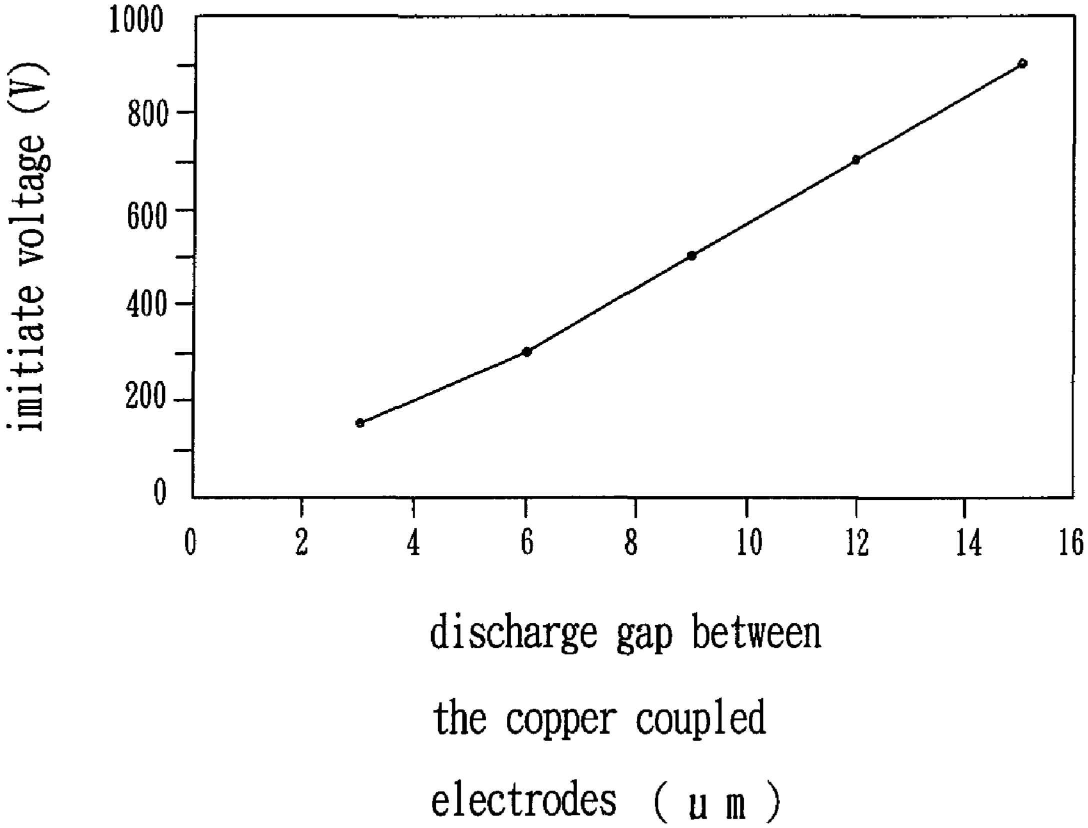
FIG. 4 PRIOR ART
FIG. 4 is a drawing showing the relation between the discharge initiation voltage of a traditional protective device and the gap distance of its metal coupled electrodes.

The chip scale gas discharge protective device 3 shown in FIG. 3 fabricated with above steps comprises;

an aluminum oxide substrate 31;

a seed layer 32 formed on the aluminum oxide substrate 31;

a pair of protruded coupled electrodes 331, 332 formed on the seed layer 32 with a gap 333 intercalating between their discharge terminals 331A, 332A, the tips thereof being constructed into a protruded arch figure;

a bridge layer 34 affixing to the discharge terminals 331A, 332A of the coupled electrodes 331, 332, and a pore 341 formed at the center of the bridge layer 34 at the position over the middle point of the gap 333 between the two electrodes 331, 332;

a high molecular dry film protective layer 35 formed on the bridge layer 34 to enclose part of the coupled electrodes 331, 332, and part of the seed layer 32;

an exterior protective layer 36 formed on the high molecular dry film protective layer 35 to enclose part of the coupled electrodes 331, 332, and part of the seed layer 32;

a pair of rear electrodes 371, 372;

a pair of terminal electrodes 381, 382; and a pair of soldered interfacial layers 391, 392.

The chip scale gas discharge protective device fabricated as such has a discharge gap effectively controlled in the range of merely several μm. Accordingly, an appropriate potential difference between the electrodes will be able to ionize the gas to avoid the occurrence of ESD on the protected electronic device.

While the invention has been described in terms of what is presently considered to be the most practical and preferred embodiment, it is to be understood that the invention needs not be limited to the disclosed embodiment. Moreover, it is intended to cover various modifications and similar arrangement included within the spirit and scope of the appended claims which are to be accorded with the broadest interpretation so as to encompass all such modifications and similar structures.

What is claimed is:

1. A method of fabricating a chip scale gas discharge protective device, including steps of copper coupled electrodes fabrication and an intermediate air chamber fabrication; wherein said copper coupled electrodes are fabricated by a photolithography process to form said copper coupled electrodes having a gap with a distance of only 0.5~10 μm.

2. The method as claimed in claim 1, wherein said intermediate air chamber is fabricated by using a high molecular substance as a bridge layer to affix to said copper coupled electrodes, and a pore is opened on said bridge layer at the center position of said gap between said coupled electrodes and then enclosed with a high molecular dry film as a protective layer.

3. The method as claimed in claim 1, wherein the steps of fabricating said copper coupled electrodes are:

preparing a substrate;

forming a seed layer on said substrate;

coating a photo resist substance on said seed layer;

removing part of said photo resist substance after exposing and developing;

forming said copper coupled electrodes on the exposed portion of said seed layer not covered by said photo resist substance by plating so as to make a pair of copper coupled electrodes apart from each other with a distance of 0.5~10 μm between their terminals;

removing remained said photo resist layer; and removing said seed layer.

4. The method as claimed in claim 1, wherein the fabrication of said intermediate air chamber comprises the following steps:

forming a bridge layer with a high molecular substance on said 0.5~10 μm apart paired copper coupled electrodes, and forming a pore on said bridge layer above said gap;

affixing a high molecular dry film to said bridge layer so as to serve as a first protective layer;

forming a second protective layer on said high molecular film;

forming a pair of rear electrodes by coating;

forming a pair of soldered interfacial layers by coating; and forming a pair of terminal electrodes by coating.

5. The method as claimed in claim 3, wherein the fabrication of said intermediate air chamber comprises the following steps:

forming a bridge layer with a high molecular substance on said 0.5~10 μm apart paired copper coupled electrodes, and forming a pore on said bridge layer above said gap;

affixing a high molecular dry film to said bridge layer so as to serve as a first protective layer;

forming a second protective layer on said high molecular film;

forming a pair of rear electrodes by coating;

forming a pair of soldered interfacial layers by coating; and forming a pair of terminal electrodes by coating.

6. The method as claimed in claim 3, wherein said seed layer is made of a TiW/Cu film.

7. A chip scale gas discharge protective device comprising:

a substrate;

a seed layer formed on said substrate;

a pair of protruded coupled electrodes formed by a photolithography process on said layer with a gap of only 0.5~10 between their discharge terminals;

a bridge layer affixing onto said pair of coupled electrodes;7 a high molecular dry film protective layer formed on said bridge layer;

an exterior protective layer formed on said high molecular dry film protective layer;

a pair of rear electrodes;

a pair of terminal electrodes; and a pair of soldered interfacial layers.

8. The protective device as claimed in claim 7, wherein the material for forming said metal electrode and said seed layer is selected one from copper, copper alloy, silver, silver alloy, titanium, titanium alloy, nickel, nickel alloy, gold, gold alloy, platina, platina alloy, aluminum, or aluminum alloy.

9. The protective device as claimed in claim 7, wherein said high molecular dry film is selected from epoxy, polyamide, acryle, and silicon.

* * * * *